(12) United States Patent
Brüssel

(10) Patent No.: US 8,485,077 B2
(45) Date of Patent: Jul. 16, 2013

(54) TREATMENT DEVICE FOR MATERIAL STRANDS AND METHOD FOR TREATING A MATERIAL STRAND

(75) Inventor: Richard Brüssel, Sulzfeld (DE)

(73) Assignee: Schmidt & Heinzmann GmbH & Co. KG, Bruchsal (DE)

( * ) Notice: Subject to any disclaimer, the term of this patent is extended or adjusted under 35 U.S.C. 154(b) by 407 days.

(21) Appl. No.: 12/451,973

(22) PCT Filed: Jun. 13, 2008

(86) PCT No.: PCT/EP2008/004766
§ 371 (c)(1),
(2), (4) Date: Apr. 15, 2010

(87) PCT Pub. No.: WO2008/151815
PCT Pub. Date: Dec. 18, 2008

(65) Prior Publication Data
US 2010/0218654 A1    Sep. 2, 2010

(30) Foreign Application Priority Data

Jun. 15, 2007    (DE) .......................... 10 2007 027 531

(51) Int. Cl.
*B26D 7/06*    (2006.01)
(52) U.S. Cl.
USPC .................................. 83/155; 83/424; 83/426

(58) Field of Classification Search
USPC ..................... 83/155, 424, 426; 198/588, 594, 198/812, 861.5
See application file for complete search history.

(56) References Cited

U.S. PATENT DOCUMENTS

| | | | | |
|---|---|---|---|---|
| 4,308,772 A | * | 1/1982 | Lingl et al. | ........................ 83/23 |
| 4,662,255 A | * | 5/1987 | Toon | .............................. 83/104 |
| 4,790,224 A | | 12/1988 | Krutilla et al. | |
| 5,555,968 A | * | 9/1996 | Seefeldt et al. | ............... 198/594 |
| 2005/0042319 A1 | | 2/2005 | Brussel | |
| 2006/0196332 A1 | | 9/2006 | Downing et al. | |

FOREIGN PATENT DOCUMENTS

| | | | |
|---|---|---|---|
| DE | 40 11 104 C1 | | 5/1991 |
| WO | WO-2006068474 | * | 6/2006 |

OTHER PUBLICATIONS

International Search Report mailed on Oct. 10, 2008 for the corresponding International patent application No. PCT/EP2008/004766.
German Search Report mailed on Jan. 22, 2009 for the corresponding German patent application No. 10 2007 027 531.7.

\* cited by examiner

*Primary Examiner* — Stephen Choi
(74) *Attorney, Agent, or Firm* — Posz Law Group, PLC

(57) ABSTRACT

A treatment device for material strands having a separating device for dividing a material strand and a transport system. The treatment device comprises at least one front and one rear transport unit. At least one drive unit is provided for moving at least one transport unit relative to the other transport unit.

17 Claims, 2 Drawing Sheets

US 8,485,077 B2

TREATMENT DEVICE FOR MATERIAL STRANDS AND METHOD FOR TREATING A MATERIAL STRAND

CROSS REFERENCE TO RELATED APPLICATIONS

This application is a U.S. national stage application of PCT/EP2008/004766 filed on Jun. 13, 2008, and claims priority to, and incorporates by reference, German patent application No. 10 2007 027 531.7 filed on Jun. 15, 2007.

BACKGROUND

The invention proceeds from a treatment device for material strands and a method for treating a material strand.

The publication DE 102 33 299 A1 discloses an apparatus with a lifting device and a method for receiving a material strand in the form of a plasticitate, in particular a tacky plasticitate, which lies on a conveyor belt, for transport and for depositing in the press mold of a molding press. In this case, the plasticitate is received by one or more elastic carrier plates.

If the material strand is to be cut, direct methods, as they are referred to, are known, in which continuously discharged, fiber-reinforced, tacky and limp material strands are processed directly into a molding. These material strands are mostly received and transported further on by wire mesh belts.

Cutting takes place, in the discharged state, mostly by shears, so that the tacky material strand is not pressed onto the conveyor belt. For this purpose, the transport system is divided, for example, into two transport units, so that shear parts are accommodated between the end deflection and start deflection of the two transport units.

As a rule, as mentioned, the discharge of the material strand takes place continuously and often also at variable speed. The shears for cutting are therefore co-moved with the transport units at the current discharge speed. After the cut has taken place, the shears are moved back into their initial position again, so as to be ready for the next cut. The return speed and the respective transport unit speed are set such that the uncut material strand on the front transport unit experiences only the discharge speed. After the cutting operation and before the return, the rear transport unit can transport the cut-to-length material strand away at higher speed. By the conveyor belt being subdivided by the shear gap, narrow limits are placed on the limpness of the material strand, this being further intensified by its tackiness. Although this can be counteracted by means of non-stick coatings or non-stick powder on the conveyor belt, it is nevertheless still necessary to have a sufficiently high rigidity of the material strand so that it can overcome the gap. On the other hand, if the material strands are thick, the cut surfaces may adhere to the shear blades and prevent fault-free production.

The object on which the invention is based is, in particular, to provide a treatment apparatus for material strands and a method for treating material strands, by means of which an improved handling of limp, thin and tacky material strands can take place.

This is achieved, according to the invention, by means of the features of the independent claims. Further refinements may be gathered from the subclaims.

SUMMARY

The invention proceeds from a treatment apparatus for material strands, with a separation device for subdividing a material strand and with a transport system which has at least one front and one rear transport unit. It is proposed that at least one drive unit be arranged, which is provided for moving at least one transport unit in relation to the other transport unit. As a result, even a thin material strand which is not especially rigid can easily bridge a gap between the transport units. A drive unit is to be understood here, in particular, as meaning a device which can move both transport units and/or each transport unit individually in any desired direction. The material strand preferably consists of a plastic material, preferably of a plasticitate. The gap usually has a width of between 10 and 30 mm, but ideally is coordinated with the conditions of the material to be processed. Advantageously, a separation device is arranged at the gap between the transport units. The separation device is advantageously formed by two cutting blades which are arranged in each case above and below the material strand. However, other separation means, such as, for example, laser arrangements, which seem expedient to a person skilled in the art may also be envisaged. If the detached part of the material strand lies on the rear transport unit after the separating operation, it can, for example, be transported further on at increased speed. The subdivision of the transport system into individual transport units movable in relation to one another along an axis of the transport direction affords further advantages by virtue of further refinements. Thus, not only limp and relatively thin and even tacky material strands can be subdivided reliably, but also relative thick material strands, in particular tacky material strands. The designation "front transport unit" is preferably to be understood as meaning the transport unit which, as seen in the transport direction, is arranged nearer to a discharge point of the material strand. Similarly to this, the term "rear transport unit" defines the transport unit further removed from the discharge point in the transport direction.

Moreover, it is proposed that the front transport unit is movable in the transport direction and/or in relation to the material strand. What can advantageously be achieved thereby is that, after the subdivision of the material strand and after the detached part of the material strand has been transported away, a newly projecting start of a material strand lies reliably on a transport unit. In addition, the situation can be prevented where it is bent down and runs into the gap region. A movement of the front transport unit in relation to the material strand in the transport direction can be ensured in the case of a constant speed of the material strand by a movement of the entire front transport unit. The net speed of the front transport unit remains the same in comparison with a discharge and/or cutting speed, since the movement of the front transport unit in the transport direction is compensated by an uncontrolled movement of a conveyor belt of the front transport unit opposite to the transport direction.

The transport units may preferably be movable in relation to one another such that, in the event of an approach during a movement, a first artificial apex line of an end deflection of the front transport unit at least coincides in the transport direction with a second artificial apex line of a start deflection of the rear transport unit. Consequently, the gap between the transport units is reliably overcome, and the start of a material strand is reliably brought to the rear transport unit. An undesirable run of the starting piece of the material strand around the end deflection of the front transport unit can therefore be avoided.

Furthermore, a depositing of the start of a material strand on the rear transport unit is advantageously facilitated if the drive unit for this purpose is provided for guiding the artificial apex line of the first transport unit over the artificial apex line of the second transport unit. An artificial apex line is to be understood as meaning an imaginary line which runs through an apex and, in particular, in each case through the apex of the end deflection of the front transport unit or through the apex of the start deflection of the rear transport unit. The apex, in turn, is defined as the point at which the conveyor belts of the transport units change their transport direction. The artificial apex lines through the apices of the front end deflection of the front transport unit and of the start deflection of the rear transport unit preferably run parallel to one another.

Advantageously, a height setting unit may be arranged, which is provided for causing a relative movement in the vertical direction, whereby the components of the treatment apparatus for material strands, such as, for example, the drive unit and/or the transport units, can, particularly in different operating modes, be positioned in relation to one another in a simple way. The height setting unit may be a device operated manually, mechanically, electrically, electromagnetically, pneumatically and/or hydraulically.

In a further refinement of the invention, a height offset between the two transport units can be set by means of the height setting unit. This further facilitates a transition of the start of a material strand from the front to the rear transport unit in order to prepare for a new separating cut in the material strand. The height offset is ideally between 1 mm and 4 mm greater than the end deflection of the front transport unit, which has a diameter of 8 to 50 mm, preferably of approximately 30 mm. In general, the diameter of the end deflection can be coordinated with the conditions, such as the material and/or rigidity, of the conveyor belt of the transport unit and/or of the material strand to be transported.

A lifting cylinder may be provided in order to set the height offset. Thus, for example, the lifting cylinder can directly cause a height offset of the two transport units and/or of only one transport unit, in that, for example, one end of one transport unit is raised, or can cause such a height offset indirectly via a guided movement of the transport unit. However, other means may also be envisaged which a person skilled in the art considers to be expedient so that a height offset can be set.

Additionally or alternatively, the height setting unit may have at least one ramp. Thus, for example, the lifting cylinder can indirectly cause a height offset of the two transport units, in that, via a movement of the corresponding transport unit along the ramp, the transport unit is coercively guided in a vertical and horizontal direction. This leads to a sufficient lifting movement in an especially simple and reproducible way. A ramp is to be understood here, in particular, as meaning a connecting section between two preferably horizontal subsections, the connecting section having an angle of inclination deviating from 180 degrees in relation to the subsections. The angle of inclination and/or the length of the connecting section are advantageously coordinated, in turn, with the dimension of the end deflection of the front transport unit or with the height offset. Any other measure which seems expedient to a person skilled in the art may, however, also be adopted, for example with a chain mechanism and the like, in order to bring about a height offset.

The transport units may have at least one start deflection and one end deflection, a diameter of the end deflection of the front transport unit being smaller than a diameter of the start deflection of the rear transport unit. As a result, in the event of an approach, an overlap of the two transport units in the axis of the transport direction can be made possible, so that an excessive lifting movement or a needlessly bulky set-up for achieving the lifting movement can be avoided. Correspondingly, in the case of a continuous material discharge from a nozzle, the material strand can be processed sufficiently quickly.

A combination of a movement of the two transport units one over the other with the smaller diameter of the end deflection of the front transport unit has an especially beneficial effect here. After the separating cut has been executed, the end deflection of the front transport unit can be moved over the start deflection of the rear transport unit. In this case, advantageously, the commencement of the new material strand can be received when the end deflection is moved forward at least as far as its imaginary artificial apex line. The start, projecting for the cut, of the material strand then no longer has the possibility of being bent down. So that the transport of the material strand over the gap or from the front to the rear transport unit takes place especially reliably, the end deflection of the front transport unit can be moved over the start deflection of the rear transport unit, and the front transport unit can then be drawn away under the start of the material strand at relatively high speed. The free start of the material strand comes to lie on the rear transport unit within the shortest possible time, so that a distortion or warping of the material strand can be avoided. Ideally, the transport speed of the conveyor belt of the front transport unit can in this case be controlled randomly, since, due to the reaction of the lifting cylinder or to the vertical and/or horizontal displacement of the front transport unit, a drive train which drives the conveyor belt of the front transport unit draws this conveyor belt opposite to the transport direction. It is also conceivable that the conveyor belt speeds of the transport units, specifically both in the forward direction and in the rearward direction, are suitably set by regulation.

Furthermore, it is advantageous if the end and/or start deflection of at least one of the transport units can have a separation edge. As a result, only one movable cutting blade, instead of two movable cutting blades, is necessary for subdividing the material strand in the region of the separation device. A separation edge is to be understood here as meaning a knife edge which is preferably arranged adjustably. However, other separation means, such as a cutting wire, which seem to be expedient to a person skilled in the art may also be envisaged.

At least one of the transport units may be assigned a temperature control device. This is beneficial for the treatment of the material strand which may thereby have a desired flexibility for longer until the material strand can be brought into a final shape. Wires and/or cushions drawn into the transport unit, in particular into a transport surface of the transport unit, can act here as a temperature control device. Preferably, at least one of the transport units may have a heating device. This heating device either is introduced into at least one of the transport units and/or is arranged as a separate heating device on at least one of the transport units. Additionally or alternatively, the temperature control device may comprise a covering hood. It is especially beneficial if the covering hood comprises a heating element, for example an infrared radiator, or another expedient heating.

An advantageous guidance of the material strand is obtained if at least one control and/or regulation device is provided, which may serve for setting a respective transport speed of the transport units or of the conveyor belts belonging to the transport units and/or of other movement devices arranged. Setting takes place via drives arranged on the units and/or devices. Each of the transport units may thus be acted upon with a suitable advancing speed or else recovery speed, as compared with the other transport unit and/or also as compared with the discharge of the material strand from the nozzle. However, the control and/or regulation device may also control other parameters, such as, for example, a temperature setting of the temperature control device, of the heating device and/or of the heating element. Furthermore, the speed of the material strand discharge and/or the material thickness during material strand discharge may also be controlled by the control and/or regulation device. Moreover, a control and/or regulation of the separation device and/or of another parameter which seems to be expedient to a person skilled in the art is also possible. An information connection or a transmission of signals between the control and regulation device and its target units may take place via a cable and/or contactlessly by radio, infrared and/or ultrasound, but a further type of transmission which seems expedient to a person skilled in the art may also be envisaged.

The invention proceeds, furthermore, from a method for treating a material strand in a treatment apparatus for material strands, with a separation device by means of which the material strand is subdivided, and with a transport system having a front and a rear transport unit, onto which transport system the material strand is applied.

It is proposed, after a separating operation, at least one of the transport units is moved in relation to the other transport unit. This movement can ensure that even a thin material strand which is not especially rigid can easily overcome a gap between the transport units.

Furthermore, it is proposed that, after the subdivision of the material strand, the front transport unit is moved in the transport direction and/or in relation to the material strand. This can ensure that the newly projecting start of a material strand can reliably lie on the front transport unit, as a result of which, furthermore, the situation can be prevented where the material strand, after being subdivided, is bent down at the new start of a material strand and runs into the gap region.

Advantageously, after the subdivision, in the event of an approach of the two transport units the front transport unit can be moved over the rear transport unit. The depositing of the start of a material strand on the rear transport unit can thereby be facilitated. Furthermore, it may be advantageous if, during the transfer of the material strand from the front to the rear transport unit, the front transport unit is drawn back under the start of the material strand at a higher speed than the speed which corresponds to a transport speed of the rear transport unit or to a transport speed of the material strand. A relatively high speed is preferably selected for the drawback. Consequently, the transfer of the material strand from the front to the rear transport unit is improved, and the material strand can thereby be transported on both transport units without distortion or warping. By a suitable setting of the conveyor belt speeds, the material strand can advantageously maintain, overall, its discharge speed.

Alternatively, after the subdivision, in the event of an approach of the two transport units the rear transport unit, too, may be moved under the front transport unit. A person skilled in the art will select the suitable variant, depending on the given boundary conditions of the apparatus. It is also conceivable that a corresponding movement of both transport units in the same apparatus is possible and can be selectively set.

Processability in any subsequent molding step is improved if the material strand can be heated and/or at least kept warm on at least one of the two transport units.

In a preferred development, a metering device is arranged, which is provided for setting a material discharge of regulated thickness, such that the material strand is provided with a reduced material thickness in a subdivision region. This is advantageous especially in the case of an increased material thickness of the material strand, since a soiling of the cutting blades by thick material strand ends undesirably adhering to them can consequently be reliably avoided. A continuous discharge of the material strand and fault-free production can be achieved in spite of a subdivision of the material strand. A metering device is to be understood here as meaning a device by means of which the thickness of the material strand can be influenced, such as, for example, a discharge nozzle of regulated thickness and/or another metering device which seems expedient to a person skilled in the art. The thickness reduction lies in a range of advantageously 30% to 90%, particularly advantageously of 70% to 90%, and especially advantageously lower than 85% of the material strand thickness. Thus, for example, a preferred thickness of the material strand of 2 to 4 mm at the point of reduced thickness can be achieved.

BRIEF DESCRIPTION OF THE DRAWINGS

Further advantages may be gathered from the following drawing description. The drawing illustrates an exemplary embodiment of the invention. The drawing, the description and the claims contain numerous features in combination. A person skilled in the art will expediently also consider the features individually and combine them into appropriate further combinations.

DETAILED DESCRIPTION OF THE PREFERRED EMBODIMENTS

Figure 1:
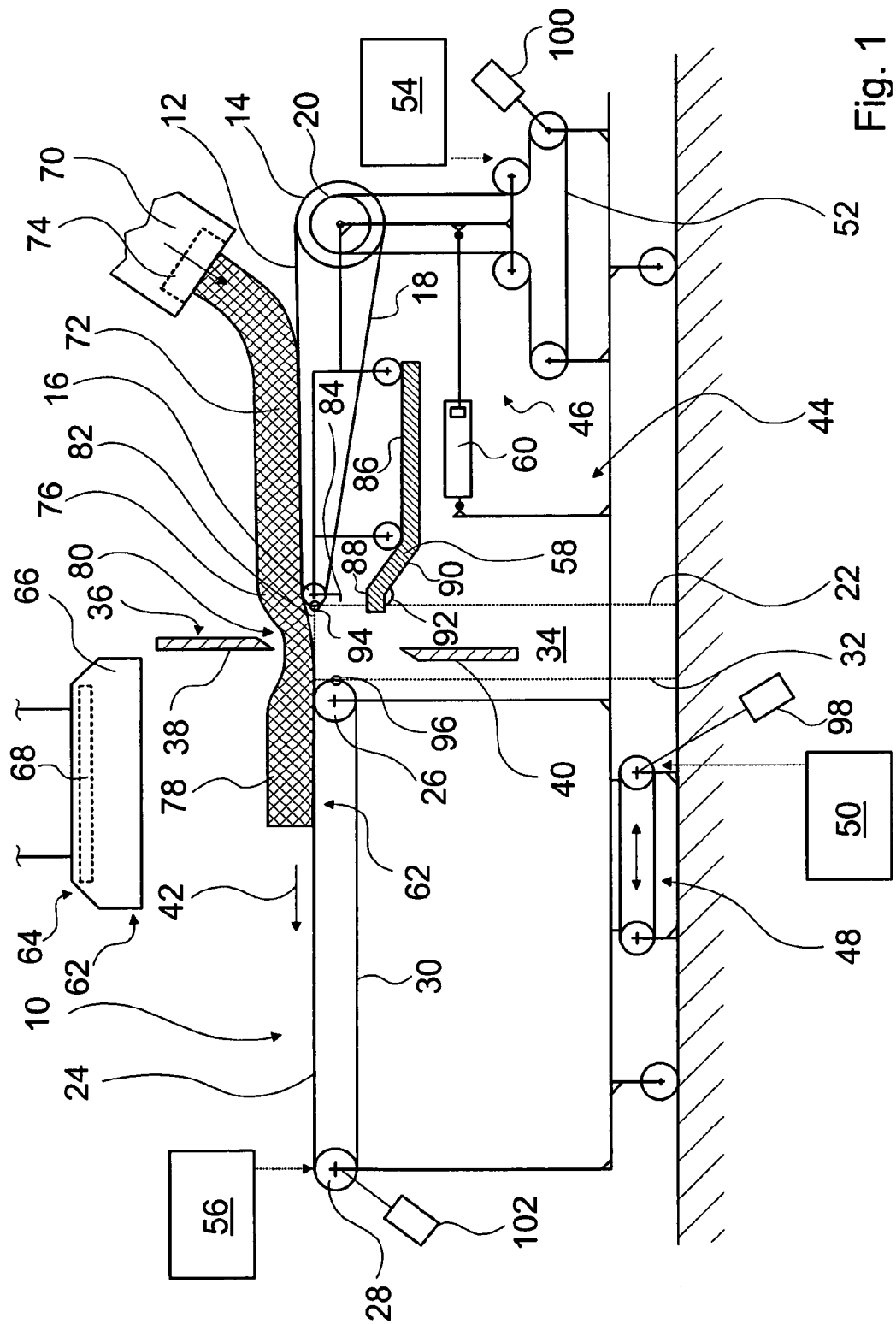
FIG. 1 is a preferred treatment apparatus for the material strands with a material strand which is transported over a gap between two transport units.
Figure 2:
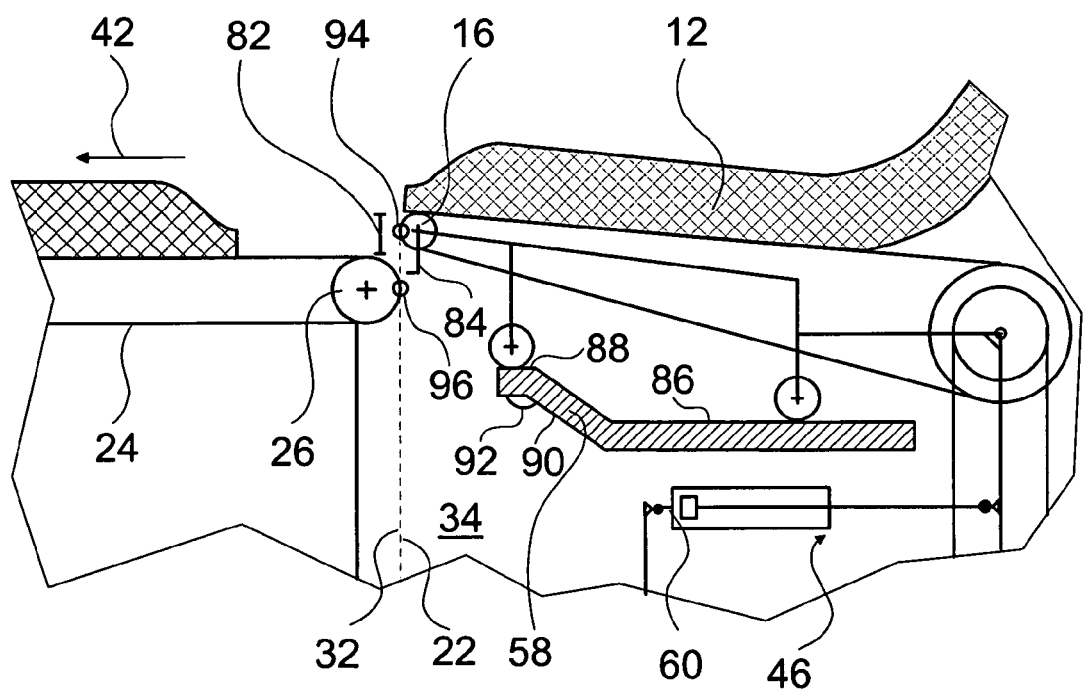
FIG. 2 is a view of a detail of FIG. 1.

To explain the invention, FIG. 1 shows by way of example a treatment apparatus, not designated in any more detail, for material strands, with a separation device 36 for subdividing a material strand 72 which can be applied to a transport system 10 in the transport direction 42. The transport system 10 is subdivided into two transport units 12 and 24 arranged in one axis. The axis corresponds to a transport direction 42 without a direction arrow. The front transport unit 12 comprises a conveyor belt 18 and also a start deflection 14 and an end deflection 16. The rear transport unit 24 comprises a conveyor belt 30 and also a start deflection 26 and an end deflection 28. A gap 34 is formed between a first imaginary artificial apex line 22, which is defined by a line at an apex 94 of the end deflection 16 of the front transport unit 12, and a second imaginary artificial apex line 32, which is defined by a line at an apex 96 of the start deflection 26 of the rear transport unit 24 (FIG. 2).

The separation device 36 is arranged in the gap 34 between the successive front and rear transport units 12 and 24 and is preferably designed as a shear device with an upper cutting blade 38 and with a lower cutting blade 40. One of the cutting blades 38, 40 may, however, also be replaced by an adjustable separation edge 84 which is arranged, for example, at the end deflection 16. The material strand 72 is led through between the shear blades 38, 40.

The separation device 36 may be moved together with the transport units 12 and 24 by means of a movement device 48 in the form of a toothed belt. The movement device 48 is driven by a regulating drive 98 and is acted upon with corresponding setting signals by a control and/or regulation device 50. The transport units 12 and 24 are driven in a similar way by regulating drives 100 and 102 and are acted upon with control or regulating signals by a control and/or regulation device 54 and 56. The control and/or regulation devices 50, 54 and 56 preferably transmit their signals by means of radio links, not illustrated in any more detail, and are also in contact with one another. It would also be conceivable that one of the control and/or regulation devices functions as a main check unit for coordinating the interactions of the control and/or regulation devices 50, 54, 56.

In order to cause the movement of the transport units 12 and 24, a drive unit 44 is arranged. A drive of the conveyor belt 18 of the front transport unit 12 takes place by means of a drive train 52 which is driven by the regulating drive 100 and can be acted upon with control or regulating signals by the control and/or regulation device 54. The drive train 52 is drive-connected to the start deflection 14 via a driving pulley 20. During the movement of the front transport unit 12 to the rear transport unit 24 in the transport direction 42, the front transport unit 12 experiences a lift, so that, by means of a height setting unit 46, a height offset 82 between the top sides of the conveyor belts 18, 30 of the two transport units 12, 24 is established. For this purpose, a lifting cylinder 60 is provided, which, during the movement of the front transport unit 12 towards the rear transport unit 24, guides the front transport unit 12 via a ramp 58. In this case, the ramp 58 is formed by a connecting section 90 between a first subsection 86 and a second subsection 88. The subsections 86, 88 are arranged horizontally, and the connecting section 90 is arranged with respect to the subsections 86, 88 at an angle of inclination 92 which deviates from 180 degrees and advantageously amounts to between 135 degrees and 170 degrees and, particularly advantageously, to approximately 150 degrees (FIG. 2).

The end deflection 16 of the front transport unit 12 has a smaller diameter than its start deflection 14 or the start deflection 26 of the rear transport unit 24. As a result, in the event of an approach between the two transport units 12, 24, the front transport unit 12 can be moved with its end deflection 16 over the start deflection 26 of the rear transport unit 24 and bridge the gap 34 completely. The first artificial apex line 22 then projects further in the transport direction 42 than the second artificial apex line 32.

The material strand 72 is deposited from a nozzle 70 onto the front transport unit 12 at a discharge speed and is transported away. In the illustration, the discharge of material from the nozzle 70 takes place with controlled thickness conveyed by means of a metering device 74, such that the material strand 72 has before the separating cut, in the subdivision region 80, at the gap 34 a lower material thickness than in the region 76 in front of the gap 34 and in the region 78 after the gap 34.

At least one temperature control device 62, such as, for example, a heating device 64, may be provided in the transport units 12, 24 and/or be assigned to the transport units 12, 24. This temperature control device 62 or this heating device 64 may be formed by at least one covering hood 66 and/or be implemented by wires and/or cushions, not illustrated in any more detail, which are respectively drawn or embedded into the conveyor belts 18, 30 of the transport units 12, 24. The covering hood 66 may serve for keeping the material strand 72 warm and/or for additionally heating it. For this purpose, at least one heating element 68, such as, for example, an infrared heater, is assigned to the covering hood 66. A sensor, not illustrated, may serve for determining the temperature in the region of the covering hood 66 and/or of the material strand 72.

A preferred method for subdividing the material strand 72 proceeds, for example, such that the material strand 72 is discharged from the nozzle 70 onto the front transport unit 12. When the start of the material strand 72 reaches the end deflection 16 of the front transport unit 12, the latter is moved by means of the lifting cylinder 60 and the ramp 58 over the start deflection 26 of the rear transport unit 24 at a speed which corresponds to the speed of the material strand 72. In this case, the drive train 52 causes a movement of the conveyor belt 18 opposite to the transport direction 42, with the result that the net speed of the front transport unit 12 remains constant. After the start of the material strand 72 has been deposited on the rear transport unit 24, the front transport unit 12 is drawn away at increased speed under the material strand 72 opposite to the transport direction 42. The front transport unit 12 is moved to its initial position and the gap 34 is released for a separating cut. When a sufficient length of the material strand 72 is provided on the rear transport unit 24, the two cutting blades 38, 40 are moved together, and a separating cut takes place. In this case, the separation device 36 and the transport units 12 and 24 are co-moved a little way in the transport direction 42 in coordination with the speed of the material strand 72 by means of the movement device 48. Subsequently, the cutting blades 38, 40 are separated again, and the separation device 36 and the transport units 12 and 24 are moved to their initial position opposite to the transport direction 42 by the movement device 48. For the cut-off part of the material strand 72 to be transported away by the rear transport unit 24, the regulating drive 102 must move the conveyor belt 30 more quickly in the transport direction 42 by the same amount as the movement device 48 moves the transport unit 24 opposite to the transport direction 42. Thus, after the separating cut has been executed, the front transport unit 12 is moved in the transport direction 42 in relation to the newly projecting material strand start, until the latter is received reliably by the front transport unit 12, specifically as far as the imaginary artificial apex line 22 of the end deflection 16. This prevents the situation where the start of a material strand is bent down into the gap 34. Thereafter, the end deflection 16 of the front transport unit 12 is moved once again over the start deflection 26 of the rear transport unit 24, and the transfer process commences anew. The speeds of the conveyor belts 18, 30 of the front and rear transport units 12, 24 and also the speeds of the transport units 12, 24 themselves and that of the movement device 48 are in this case regulated by the control and regulation device 50, 54, 56 such that the material strand 72 maintains its discharge speed and is not distorted.

By virtue of the high drawback speed and the relatively small diameter of the end deflection 16 of the front transport unit 12, the start of the material strand reliably comes loose from the conveyor belt 18 of the front transport unit 12 and consequently overcomes the gap 34 or the transport transition between the transport units 12 and 24 reliably and without warpings. Since, by virtue of this sequence, limp and relatively thin and even tacky materials can be cut reliably and, in the subdivision region 80 of the material strand 72, pass reliably over the gap 34 or the transport transition between the transport units 12, 24, even relatively thick tacky materials can be cut in this way. For this purpose, the material strand 72 is configured by means of a metering device 74, with a controlled-thickness discharge of material from the nozzle 70, such that the subdivision region 80 becomes thin, as indicated in the figure. A soiling of the cutting blades 38, 40 is markedly reduced, and fault-free production is made possible.

The invention claimed is:

1. A treatment apparatus for a material strand, comprising:
   a separation device for subdividing the material strand;
   a transport system which has at least one front transport unit and one rear transport unit on each of which the material strand can be applied for transportation along a transport direction; and at least one drive unit which is provided for moving at least one of the front transport unit and the rear transport unit in relation to the other, wherein the separation device is arranged at a gap located, as seen in the transport direction, between the front transport unit and the rear transport unit, the front transport unit being arranged, as seen in the transport direction, upstream of the rear transport unit nearer a discharge point of the material strand, the drive unit is provided for guiding an artificial apex line of the front transport unit over an artificial apex line of the rear transport unit to bridge the gap between the front transport unit and the rear transport unit, and during a movement of the front transport unit relative to the rear transport unit in a transport direction via the drive unit, the front transport unit is lifted.

2. The apparatus as claimed in claim 1, wherein the front transport unit is movable in the transport direction and/or in relation to the material strand.

3. The apparatus as claimed in claim 1, wherein the transport units are movable in relation to one another such that, in the event of an approach during movement, a first artificial apex line of an end deflection of the front transport unit coincides in the transport direction at least with a second artificial apex line of a start deflection of the rear transport unit.

4. The apparatus as claimed in claim 3, wherein the end and/or start deflection of at least one of the transport units have/has a separation edge.

5. The apparatus as claimed in claim 1, further comprising a height setting unit which is provided for causing a relative movement in the vertical direction.

6. The apparatus as claimed in claim 5, further comprising a height offset between the two transport units can be set by means of the height setting unit.

7. The apparatus as claimed in claim 5, wherein a lifting cylinder is provided in order to set the height offset.

8. The apparatus as claimed in claim 5, wherein the height setting unit has at least one ramp.

9. The apparatus as claimed in claim 1, wherein the transport unit has at least one start deflection and one end deflection, a diameter of the end deflection of the front transport unit being smaller than a diameter of the start deflection of the rear transport unit.

10. The apparatus as claimed in claim 1, further comprising a temperature control device which can be assigned to at least one of the transport units.

11. The apparatus as claimed in claim 10, wherein the temperature control device has a heating device.

12. The apparatus as claimed in claim 10, wherein the temperature control device comprises a covering hood.

13. The apparatus as claimed in claim 12, wherein the covering hood comprises at least one heating element.

14. The apparatus as claimed in claim 1, wherein a control and/or regulation device is provided for setting a respective transport speed and/or transport direction of the transport units.

15. The apparatus as claimed in claim 1, further comprising:
a ramp, wherein
during a movement of the front transport unit relative to the rear transport unit, the front transport unit is guided via the ramp.

16. The apparatus as claimed in claim 1, further comprising:
a movement device for moving the separation device together with the transport units.

17. A treatment apparatus for a material strand, comprising:
a separation device for subdividing a material strand;
a transport system which has at least one front transport unit and one rear transport unit which are arranged along one axis;
a metering device for discharging the material strand to the transport system;
at least one drive unit which is provided for moving at least one of the front transport unit and the rear transport unit in relation to the other; and
a control and/or regulation device provided for setting a respective transport speed and/or transport direction of the transport units,
wherein on each of the transport units the material strand can be applied for transportation along a transport direction,
wherein the front transport unit, as seen in the transport direction, is arranged upstream of the rear transport unit nearer a discharge point of the material strand,
wherein the separation device is arranged at a gap between the front transport unit and the rear transport unit,
wherein the drive unit is provided for guiding an artificial apex line of the front transport unit over an artificial apex line of the rear transport unit to thereby bridge the gap between the front transport unit and the rear transport unit,
wherein during a movement of the front transport unit relative to the rear transport unit in a transport direction via the drive unit, the front transport unit is lifted, and
wherein the drive unit and the control and/or regulation device are provided to draw away the front transport unit from under the material strand in a direction opposite to the transport direction after the start of the material strand has been deposited on the rear transport unit.

* * * * *